(12) United States Patent
Fetterman et al.

(10) Patent No.: US 6,393,550 B1
(45) Date of Patent: May 21, 2002

(54) METHOD AND APPARATUS FOR PIPELINE STREAMLINING WHERE RESOURCES ARE IMMEDIATE OR CERTAINLY RETIRED

(75) Inventors: Michael A. Fetterman, Hillsboro; Glenn J. Hinton, Portland; Robert W. Martell, Hillsboro; David B. Papworth, Beaverton, all of OR (US)

(73) Assignee: Intel Corporation, Santa Clara, CA (US)

( * ) Notice: Subject to any disclaimer, the term of this patent is extended or adjusted under 35 U.S.C. 154(b) by 1436 days.

(21) Appl. No.: 08/532,225

(22) Filed: Sep. 19, 1995

Related U.S. Application Data

(63) Continuation of application No. 08/202,947, filed on Feb. 28, 1994, now abandoned, which is a continuation-in-part of application No. 08/176,370, filed on Dec. 10, 1993, now Pat. No. 6,101,597.

(51) Int. Cl.[7] .................................................. G06F 9/30
(52) U.S. Cl. ...................................................... 712/214
(58) Field of Search ............................... 395/810, 375, 395/391, 372, 572, 584, 586, 800–23, 392; 712/214

(56) References Cited

U.S. PATENT DOCUMENTS

| | | | | |
|---|---|---|---|---|
| 4,736,288 A | * | 4/1988 | Shintani et al. | 395/375 |
| 4,752,873 A | * | 6/1988 | Shonai et al. | 395/800 |
| 5,136,697 A | * | 8/1992 | Johnson | 395/375 |
| 5,142,633 A | * | 8/1992 | Murray et al. | 395/375 |
| 5,313,644 A | * | 5/1994 | Matsuo et al. | 395/800 |
| 5,333,296 A | * | 7/1994 | Bouchard et al. | 395/425 |
| 5,345,569 A | * | 9/1994 | Tran | 395/375 |
| 5,355,457 A | * | 10/1994 | Shebanow et al. | 395/375 |

FOREIGN PATENT DOCUMENTS

WO      9301545    * 1/1993    ............. G06F/9/38

OTHER PUBLICATIONS

Mike Johnson, *Superscalar Microprocessor Design*, 1991 pp. 1–289.*
Popescu, et al., "The Metaflow Architecture," IEEE Micro, pp. 10–13 and 63–73, Jun. 1991.

* cited by examiner

*Primary Examiner*—John A. Follansbee
(74) *Attorney, Agent, or Firm*—Blakely, Sokoloff, Taylor & Zafman LLP

(57) ABSTRACT

Maximum throughput or "back-to-back" scheduling of dependent instructions in a pipelined processor is achieved by maximizing the efficiency in which the processor determines the availability of the source operands of a dependent instruction and provides those operands to an execution unit executing the dependent instruction. These two operations are implemented through a number of mechanisms. One mechanism for determining the availability of source operands, and hence the readiness of a dependent instruction for dispatch to an available execution unit, relies on the early setting of a source valid bit during allocation when a source operand is a retired or immediate value. This allows the ready logic of a reservation station to begin scheduling the instruction for dispatch.

20 Claims, 10 Drawing Sheets

| | RESULT DATA | LDST |
|---|---|---|
| | | |
| | | |
| | ≈ | ≈ |
| | | |
| | | |
| ROB$_5$ | DATA | EAX |
| ROB$_6$ | DATA | EBX |
| ROB$_7$ | DATA | EAX |
| ROB$_8$ | DATA | ECX |
| ROB$_9$ | DATA | ECX |
| ROB$_{10}$ | DATA | EDX |
| ROB$_{11}$ | DATA | EDX |
| ROB$_{12}$ | DATA | t |
| ROB$_{13}$ | DATA | t |

*Figure 3*

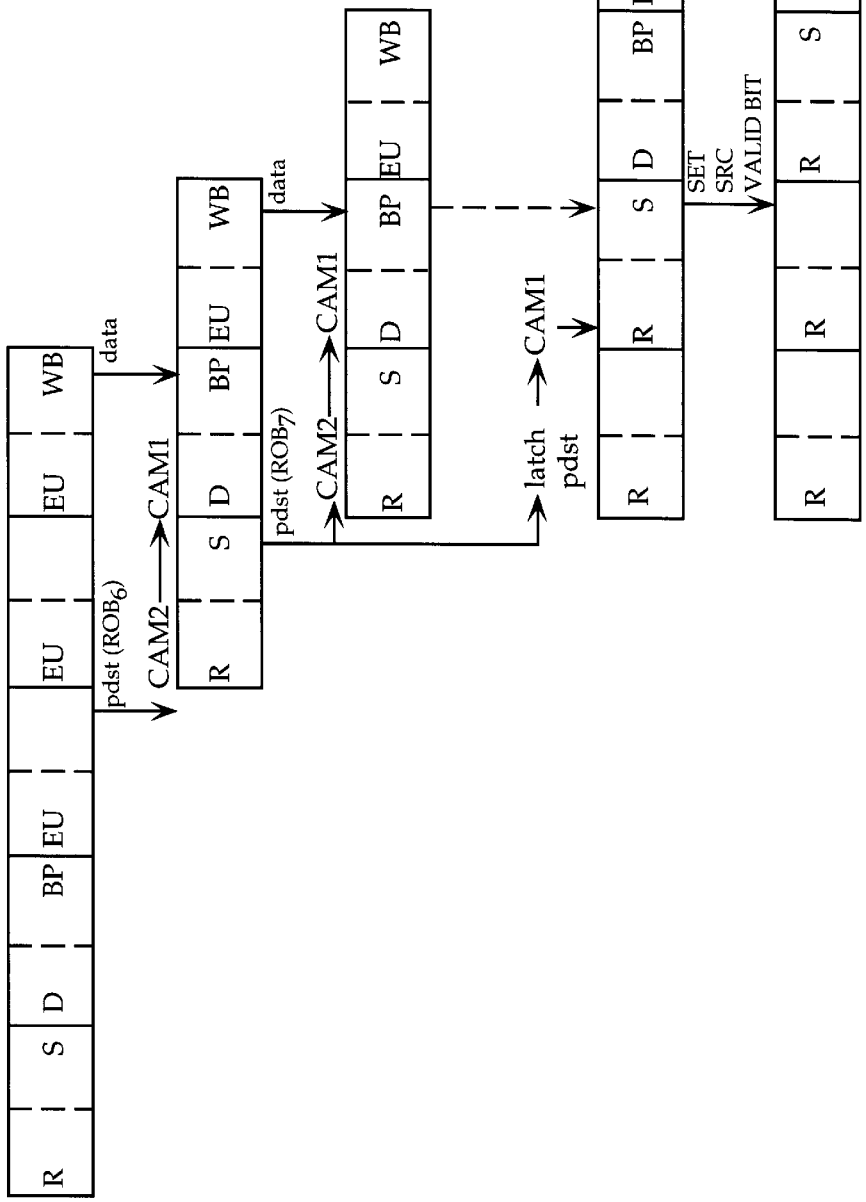

METHOD AND APPARATUS FOR PIPELINE STREAMLINING WHERE RESOURCES ARE IMMEDIATE OR CERTAINLY RETIRED

RELATED APPLICATION

The present invention is a continuation of U.S. application Ser. No. 08/202,947, filed Feb. 28, 1994 now abandoned which is a continuation-in-part application to U.S. patent application, "Method and Apparatus for Maximum Throughput Scheduling of Dependent Operations in a Pipelined Processor", Ser. No. 08/176,370 filed Dec. 30, 1993, now U.S. Pat. No. 6,101,597 and assigned to the assignee of the present invention. The present invention is related to U.S. patent applications, "Coordinating Speculative and Committed State Register Source Data and Immediate Source Data in a Processor", Ser. No. 08/177,240 filed Jan. 4, 1994 now U.S. Pat. No. 5,452,426, assigned to the assignee of the present invention.

BACKGROUND OF THE INVENTION

1. Field of the Invention

The present invention relates to pipelined microprocessors, and more particularly to achieving maximum throughput of dependent operations in a pipelined processor.

2. Art Background

Simple microprocessors generally process instructions one at a time. Each instruction is processed using four sequential stages: instruction fetch, instruction decode, execute, and result write back to the register file or memory. Within such microprocessors, different dedicated logic blocks perform each processing stage. Each logic block waits until all the previous logic blocks complete operations before beginning its operation.

To improve microprocessor efficiency, microprocessor designers overlapped the operations of the fetch, decode, execute, and write back stages such that the microprocessor operates on several instructions simultaneously. In operation, the fetch, decode, execute, and write back stages concurrently process different instructions. At each clock cycle the results of each processing stage are passed to the following processing stage. Microprocessors that use the technique of overlapping the fetch, decode, execute, and write back stages are known as "pipelined" microprocessors.

In order for pipelined microprocessors to operate efficiently, an instruction fetch unit at the head of the pipeline must continually provide the pipeline with a stream of instructions. However, conditional branch instructions within an instruction stream prevent an instruction fetch unit at the head of a pipeline from fetching the correct instructions until the condition is resolved. Since the condition will not be resolved until further down the pipeline, the instruction fetch unit cannot necessarily fetch the proper instructions.

To alleviate this problem, some newer pipelined microprocessors use branch prediction mechanisms that predict the outcome of branches, and then fetch subsequent instructions according to the branch prediction. Branch prediction is achieved using a branch target buffer (BTB) to store the history of a branch instruction based only upon the instruction pointer or address of that instruction. Every time a branch instruction is fetched, the BTB predicts the target address of the branch using the branch history. For a more detailed discussion of branch prediction, please refer to Tse Yu Yeh and Yale N. Patt, *Two-Level Adaptive Branch Prediction*, the 24th ACM/IEEE International Symposium and Workshop on MicroArchitecture, November 1991, and Tse Yu Yeh and Yale N. Patt, *Alternative Implementations of Two-Level Adaptive Branch Prediction*, Proceedings of the Nineteenth International Symposium on Computer Architecture, May 1992.

In combination with speculative execution, out-of-order dispatch of instructions to the execution units results in a substantial increase in instruction throughput. With out-of-order completion, any number of instructions are allowed to be in execution in the execution units, up to the total number of pipeline stages in all the functional units. Instructions may complete out of order because instruction dispatch is not stalled when a functional unit takes more than one cycle to compute a result. Consequently, a functional unit may complete an instruction after subsequent instructions have already completed. For a detailed explanation of speculative out-of-order execution, refer to M. Johnson, *Superscalar Microprocessor Design*, Prentice Hall, 1991, Chapters 2, 3, 4, and 7.

In a processor using out-of-order completion, instruction dispatch is stalled when there is a conflict for a functional unit or when an issued instruction depends on a result that is not yet computed. In order to prevent or mitigate stalls in decoding, a buffer (known as a reservation station (RS) may be provided between the decode and execute stages. The processor decodes instructions and places them into the reservation station as long as there is room in the buffer, and at the same time, examines instructions in the reservation station to find those that can be dispatched to the execution units (that is, instructions for which all source operands and the appropriate execution units are available).

Instructions are dispatched from the reservation station with little regard for their original program order. However, the capability to issue instructions out-of-order introduces a constraint on register usage. To understand this problem, consider the following pseudo-microcode sequence:

1. t←load (memory)
2. eax←add (eax, t)
3. ebx←add (ebx, eax)
4. eax←mov (2)
5. edx←add (eax, 3)

The micro-instructions and registers shown above are those of the well known Intel Microprocessor Architecture. For further information, reference may be made to the *i486™ Microprocessor Programmers Reference Manual*, published by Osborne-McGraw-Hill, 1990, which is also available directly from Intel Corporation of Santa Clara, Calif.

In an out-of-order machine executing these instructions, it is likely that the machine would complete execution of the fourth instruction before the second instruction, because the third ADD instruction may require only one clock cycle, while the load instruction and the immediately following ADD instruction may require a total of four clock cycles, for example. However, if the fourth instruction is executed before the second instruction, then the fourth instruction would probably incorrectly overwrite the first operand of the second instruction, leading to an incorrect result. Instead of the second instruction producing a value that the third instruction would use, the third instruction produces a value that would destroy a value that the second one uses.

This type of dependency is called a storage conflict, because the reuse of storage locations (including registers) causes instructions to interfere with one another, even though the conflicting instructions are otherwise independent. Such storage conflicts constrain instruction dispatch and reduce performance.

Storage conflicts may be avoided by providing additional registers that are used to reestablish the correspondence between registers and values. Using register renaming, these additional "physical" registers are associated with the original "logical" registers and values needed by the program. To implement register renaming, the processor may allocate a new register for every new value produced, i.e., for every instruction that writes a register. An instruction identifying the original logical register for the purpose of reading its value obtains instead the value in the newly allocated register. Thus, the hardware renames the original register identifier in the instruction to identify the new register and the correct value. The same register identifier in several different instructions may access different hardware registers depending on the locations of register references with respect to the register assignments.

With renaming, the example instruction sequence depicted above becomes:

1. $t_a \leftarrow$ load (mem)
2. $eax_b \leftarrow$ add ($eax_a, t_a$)
3. $ebx_b \leftarrow$ add ($ebx_a, eax_b$)
4. $eax_c \leftarrow$ mov (2)
5. $edx_a \leftarrow$ add ($eax_c, 3$)

In this sequence, each assignment to a register creates a new instance of the register, denoted by an alphabetic subscript. The creation of a renamed register for eax in the fourth instruction avoids the resource dependency on the second and third instructions, and does not interfere with correctly supplying an operand to the fifth instruction. Renaming allows the fourth instruction to be dispatched immediately, whereas, without renaming, the instruction must be delayed until execution of the second and third instructions. When an instruction is decoded, its result value is assigned a location in a functional unit called a reorder buffer (ROB), and its destination register number is associated with this location. This renames the destination register to the reorder buffer location. When a subsequent instruction refers to the renamed destination register, in order to obtain the value considered to be stored in the register the instruction may instead obtain the value stored in the reorder buffer if that value has already been computed.

The use of register renaming in the ROB not only avoids register resource dependencies to permit out-of-order execution, but also plays a key role in speculative execution. If the instruction sequence given above is considered to be part of a predicted branch, then one can see that execution of those instructions using the renamed registers in the ROB has no effect on the actual registers denoted by instruction. Thus, if it is determined that the branch was mispredicted, the results calculated and stored in the ROB may be erased and the pipeline flushed without affecting the actual registers found in the processor's register file (RF). If the predicted branch affected the values in the RF, then it would be difficult to recover from branch misprediction because it would be difficult to determine the values stored in the registers before the mispredicted branch was taken without the use of redundant registers in the ROB.

When a result is produced, it is written to the ROB. The result may provide an input operand to one or more waiting instructions buffered in the reservation station, indicating that the source operand is ready for dispatch to one or more execution units along with the instructions using the operand. When dependent instructions are pipelined, the process of waiting for the result data to be written back from an execution unit in order to determine the availability of a source operand adds latency to the system, thereby limiting instruction throughput. Further, for source operands that are immediate values or for source operands that are already retired to architecturally visible registers, waiting for a write back as a result of a ROB read further delays the scheduling of operations that might otherwise be scheduled. Thus, it is desired to find a means for increasing the throughput of dependent instructions in a pipelined processor.

SUMMARY OF THE INVENTION

The present invention provides a method and apparatus for maximum throughput scheduling of dependent instructions in a pipelined processor. Each instruction is buffered in a reservation station awaiting dispatch to an execution unit. Dispatch occurs when all of an instruction's source operands are available and the appropriate execution unit is available. Each instruction entry in the reservation station includes at least one source data field for storing a source operand of the instruction and an associated source data valid bit. Maximum throughput or "back-to-back" scheduling is achieved by maximizing the efficiency in which the processor determines the availability of the source operands of a dependent instruction and in which the processor provides those operands to the execution unit executing the dependent instruction. These two operations are implemented through a number of mechanisms.

One mechanism for determining the availability of source operands, and hence the readiness of a dependent instruction for dispatch to an available execution unit, relies on the prospective determination of the availability of a source operand before the operand itself is actually computed as a result of the execution of another instruction. Storage addresses of the source operands of an instruction are stored in a content addressable memory (CAM). Before an instruction is executed and its result data written back, the storage location address of the result is provided to the CAM and associatively compared with the source operand addresses stored therein. A CAM match and its accompanying match bit indicate that the result of the instruction to be executed will provide a source operand to the dependent instruction waiting in the reservation station.

Readiness of a source operand may also be determined according to the state of the source data valid bit. Upon allocation of a dependent instruction containing an immediate operand to the reservation station, the source data valid bit associated with the immediate operand is set. Additionally, for allocation of a dependent instruction containing an operand which has already been retired to the processor's real register file (RRF), the source data valid bit associated with the retired operand is set. Also, the valid bit may be set and used to determine the availability of an operand if the result has been computed by a previous instruction that has already been executed.

Based upon the match bits and/or the source valid bits, a ready logic circuit determines whether all source operands of a dependent instruction are available and thus whether an instruction is ready for dispatch to an available execution unit.

An execution unit receiving a dispatched instruction obtains the source operands by a number of mechanisms. If the operand is an immediate value, then the execution unit receives that value from the source data field of the reservation station entry storing the dispatched instruction. If the operand was already computed through execution of a previous instruction before allocation of the dispatched dependent instruction to the reservation station, then the operand is written to a register buffer. The register buffer comprises a reorder buffer storing speculative result data and a real register file holding retired result data. Upon allocation of the dependent instruction to the reservation station, the operand is written from the register buffer to the appropriate source data field of the instruction in the reservation station. If the operand is computed after allocation, but before dispatch of the dependent instruction, then the operand is written directly to the appropriate source data field of the reservation station entry storing the instruction. Finally, using a bypass mechanism of the present invention, if the operand is computed after dispatch of the dependent instruction, then the source operand is provided directly from the execution unit computing the source operand to a source operand input of the execution unit executing the dependent instruction. In the case of source operands which are immediate values or values which have already retired to the real register file, the source valid bits for these sources may be set early in the pipeline, thus providing for even earlier scheduling of dependent operations.

Through these mechanisms, the combination of efficiently determining the readiness of an instruction for dispatch and efficiently providing source operands to an execution unit result in maximum instruction execution throughput.

BRIEF DESCRIPTION OF THE DRAWINGS

The objects, features and advantages of the present invention will be appreciated by one skilled in the art in light of the following detailed description in which:

FIG. 3 illustrates a representation of a table maintained in a reorder buffer utilized by one embodiment of the present invention.

FIG. 4 illustrates pipeline stages implemented by the microprocessor of the present invention.

FIG. 5 illustrates an example of the back-to-back scheduling achieved by the present invention.

DETAILED DESCRIPTION OF THE INVENTION

The present invention provides a method and apparatus for maximum throughput scheduling of dependent instructions in a pipelined processor. To achieve this result, the present invention prospectively determines the availability of the source operands of a dependent instruction before the operands themselves are computed. For purposes of explanation, specific embodiments are set forth to provide a thorough understanding of the present invention. However, it will be appreciated by those skilled in the art that the present invention may be practiced without these details. In other instances, well known elements, devices, process steps and the like are not set forth in detail in order to avoid unnecessarily obscuring the present invention.

Figure 1:
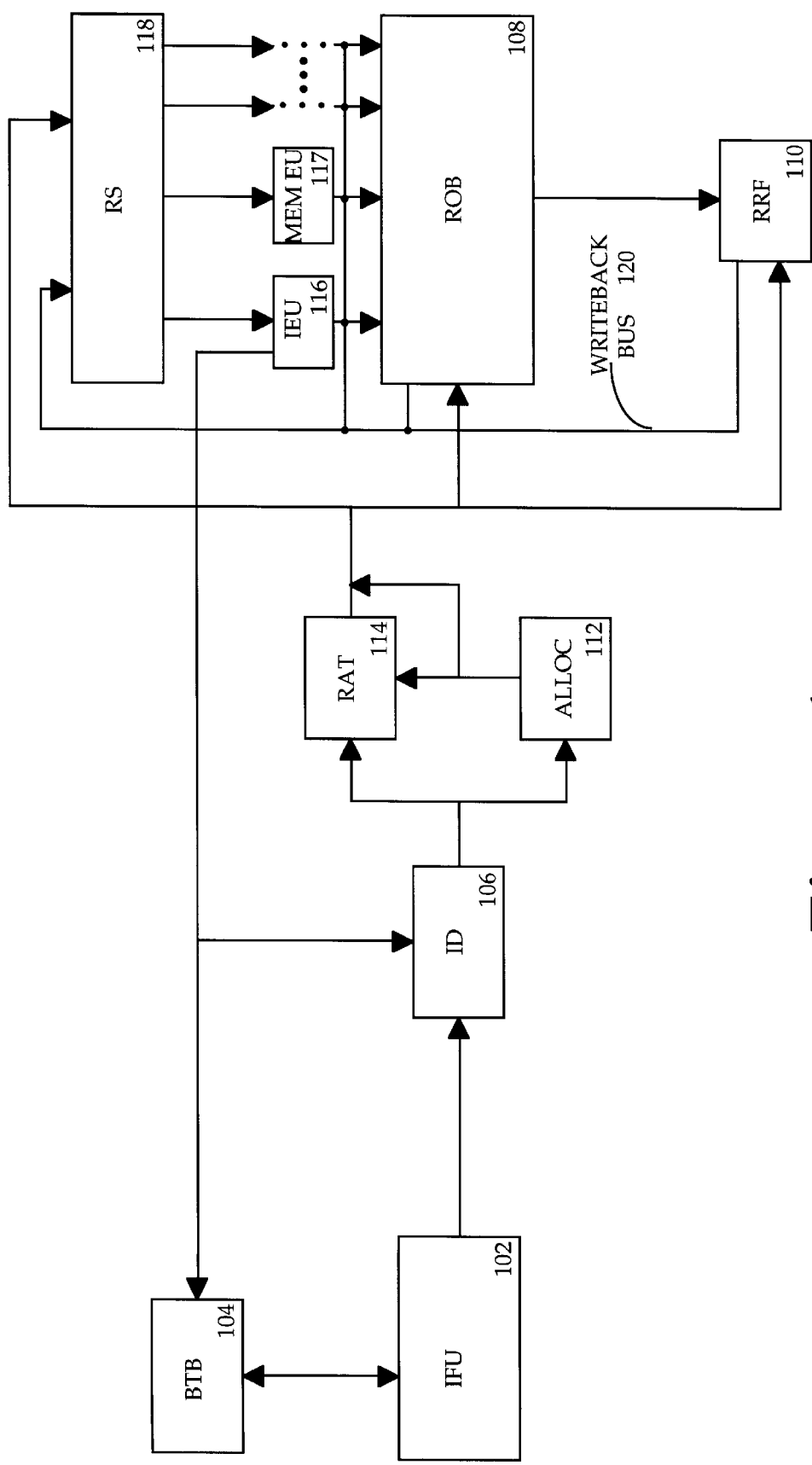
FIG. 1 is a block diagram illustrating a portion of a microprocessor incorporating the present invention.

FIG. 1 is a block diagram of an embodiment of a speculative out-of-order processor in accordance with the present invention. The processor comprises an instruction fetch unit (IFU) 102 coupled to a branch target buffer (BTB) 104 and an instruction decoder (ID) 106. Base upon the instruction pointer (IP) provided by the BTB 104 to the IFU 102, the IFU 102 fetches the macro instruction found at the address in memory (not shown) that is indicated by the IP. The instruction is decoded into one or more micro-operations (uops) by the instruction decoder 106. Such a decoding mechanism is found in the Intel and similar microprocessor architectures. The instruction decoder 106 transfers the stream of uops to a register alias table (RAT) 114 and an allocator (ALLOC) 112. In one embodiment, the instruction decoder 106 issues up to three in-order uops during each cycle of the processor.

The allocator 112 assigns each incoming uop to a location in the reorder buffer (ROB) 108, thereby mapping the logical destination address (LDST) of the uop to a corresponding physical destination address (PDST) in the ROB. A register alias table (RAT) 114 maintains this mapping.

The contents of a ROB register are retired to a location in a real register file (RRF) 110. The RAT 114 thus also stores a real register file valid bit (RRFV) that indicates whether the value indicated by the logical address is to be found at the physical address in the ROB or in the RRF after retirement. Based upon this mapping, the RAT 114 also associates every logical source address to a corresponding location in the ROB or the RRF (the source operand of one instruction generally must have been the destination of a previous instruction).

Figure 2:
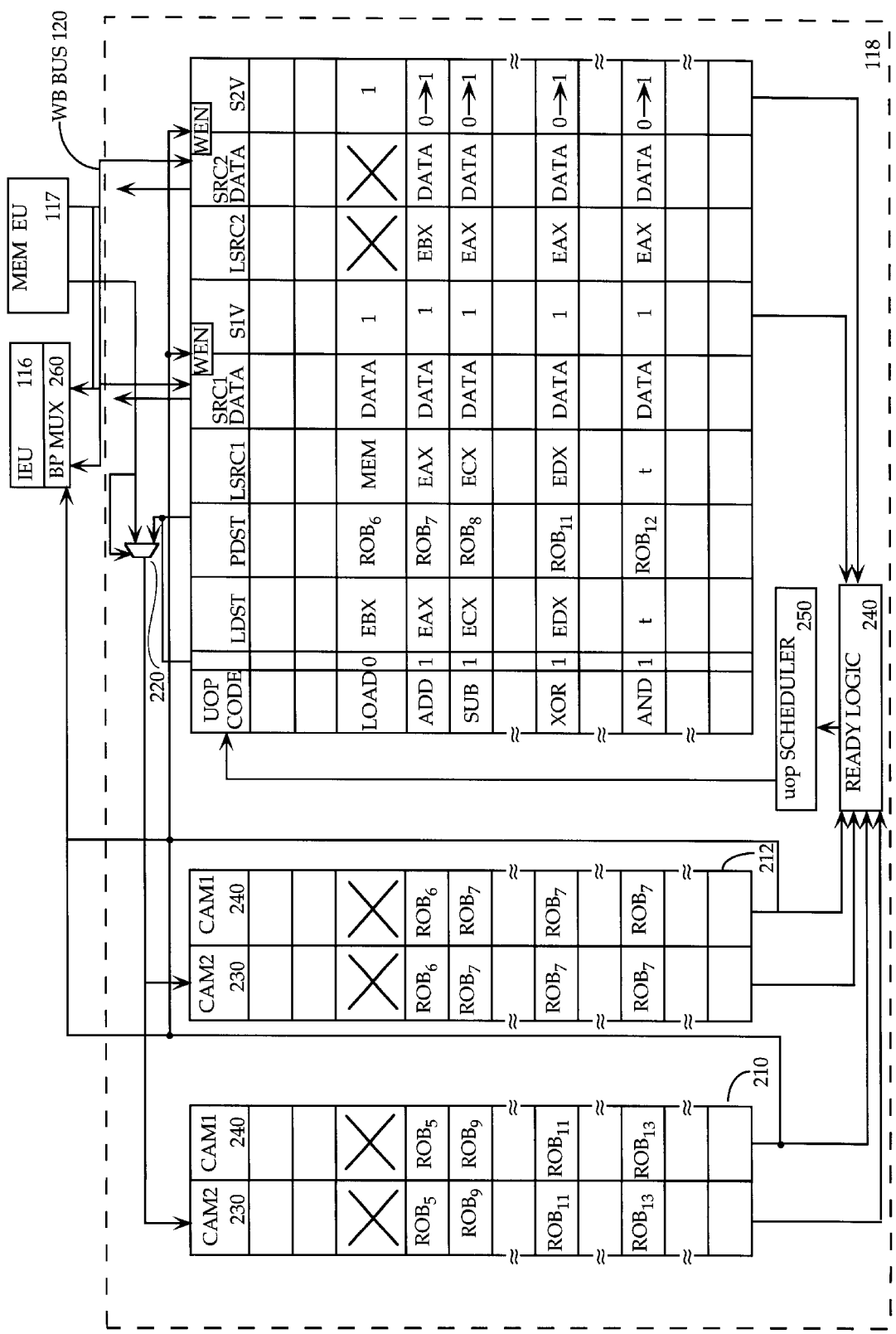
FIG. 2 illustrates a reservation station implementing aspects of the present invention.

Each incoming uop is also assigned and written into an entry in the reservation station 118 by the allocator 112. As shown in FIG. 2 the reservation station (RS) 118 assembles the micro-operations awaiting execution by an appropriate execution unit, such as integer execution unit (IEU) 116 or memory execution unit (MEM EU) 117.

For purposes of illustration, entries 2, 3, 4, 7 and 11 of the RS 118 buffer the micro operations (uops) of the following instruction sequence:

| macro op | uop |
|---|---|
| LOAD (ebx, mem) | ebx ← load (mem) |
| ADD (eax, ebx) | eax ← add (eax, ebx) |
| SUB (ecx, eax) | ecx ← sub (ecx, eax) |
| XOR (edx, eax) | edx ← xor (edx, eax) |
| AND (t, eax) | t ← and (t, eax) |

In one embodiment this instruction sequence is fetched from an instruction cache (not shown) by the IFU 102 according to predicted instruction pointers from the BTB 104. As an example, the ADD macro instruction is decoded by the instruction deoder 106 into the micro operation eax←add(eax,ebx) in the Intel Microprocessor Architecture.

FIG. 3 illustrates a table in the ROB 108 showing the mapping of the logical registers specified by the instruction sequence to physical registers in the ROB. In this example, the first logical source eax register (LSRC1 in FIG. 2) of the ADD instruction, which must contain the result of a prior instruction, is mapped by the RAT 114 to the physical destination address (PDST) of that prior instruction at ROB entry PDST=ROB$_5$. Because the logical source register address (LSRC1) of the ADD instruction is the same as the logical destination address (LDST) of the prior instruction, LSRC1 is mapped to a first physical source register address (PSRC1) at the same ROB entry PDST=ROB$_5$. Similarly, the second logical source register ebx (LSRC2), which also must contain the result of a prior instruction, is mapped to a second physical source register (PSRC2) at ROB entry PDST=ROB$_6$. The logical destination register address (LDST) of the ADD instruction, also designated by the logical register address eax, is mapped to a physical destination register address (PDST) at ROB entry PDST=ROB$_7$. Similarly, the other instructions have their logical sources and destinations mapped to physical register identifiers in the ROB 108 by the RAT 114, and their corresponding uops are written into the entries of the reservation station 118. For reasons described below, the physical source register addresses PSRC1 and PSRC2 are stored as tags in content addressable memory (CAM) matching circuitry 210 and 212 for the first and second source operands, respectively. Any number of well known methods and circuits for performing CAM matching of an array of CAM cells against a data input may be used to implement the present invention.

Note that the ADD instruction depends upon the result of the load instruction in that the second source operand of the ADD instruction is stored in the same logical register (ebx) as the result of the load instruction. Similarly, the subtract, exclusive OR (XOR) and AND instructions are dependent upon the ADD instruction in that the ADD instruction writes its results to the eax register, which is the second source operand of those three dependent instructions. For purposes of this example, the ecx, edx and t (temporary) source operand registers are assumed to hold valid data as a result of the execution of previous operations (not shown).

After the logical sources and destinations of a uop have been mapped to physical sources and destinations, and the uop stored at an available entry in the reservation station 118 by the allocator 112, the micro instruction is scheduled for dispatch and executed according to the pipeline stages illustrated in FIG. 4. In one embodiment, the pipestages are divided according to processor clock cycles, with the solid vertical lines representing a rising clock edge and the dashed vertical lines representing a falling clock edge.

In general, during the READY pipestage, the reservation station 118 determines whether the source operands for a micro instruction are available and whether the execution unit for executing that micro instruction is also available. If ready, then the micro instruction enters the SCHEDULE pipestage in which the reservation station determines whether multiple uops need to be dispatched for execution by the same execution unit, and, if so, arbitrates among such uops to determine the order in which they are to be dispatched. During the DISPATCH pipestage, the scheduled uop is read from its entry in the reservation station and delivered to the scheduled execution unit. As will be described in more detail below, after the dispatch of a uop, a POTENTIAL BYPASS pipestage is made available in which result data needed by the uop may be bypassed directly from the execution unit executing a previous instruction to the execution unit executing the current uop. This avoids the necessity of writing the result data to the reservation station 118 or the ROB 108 and then reading the data out as a source operand of the currently executing uop, thus increasing instruction throughput.

During the EXECUTION UNIT and WRITE BACK stages, a uop may then be executed by the scheduled functional unit, and the result data written back from the execution unit into its corresponding ROB entry and into entries of the reservation station 118 that holds uops requiring the result data as a source operand. In addition, as mentioned above, the result data may be bypassed directly to an execution unit requiring the result data. It should be understood that the reservation station pipeline stages that are illustrated in FIG. 4 are but one means of processing an instruction according to the present invention. The present invention is not limited to a processor implementing the pipestages of FIG. 4, but is applicable to any pipelined microprocessor.

As illustrated in FIG. 5, the present invention enables the pipeline stages of micro instructions to be overlapped "back-to-back" in such a way as to achieve maximum execution throughput of the instructions. In processors using the pipestages of FIG. 4, such back-to-back scheduling results in a one cycle throughput. In this example, FIG. 5 illustrates the back-to-back pipelining of the micro instructions of the exemplary micro instruction sequence described above.

In FIG. 5, the load instruction passes through the READY and SCHEDULE stages, and then is dispatched to the memory execution unit 117. In this implementation, the execution of a load instruction takes three clock cycles. After execution, the result data, which is to be stored at the logical source register ebx and the corresponding physical destination register ROB$_6$, is placed on a write back bus 120 (FIG. 2) so that it may be written into the appropriate PDST entry of the ROB. The result of the load instruction also provides a source operand for the subsequent add micro instruction.

According to one embodiment of the present invention, the memory execution unit 117 provides the PDST of the result two cycles before writing back the result data. This feature is used to allow the dependent ADD instruction to be scheduled for dispatch early enough to allow for the bypassing of the result data. With respect to scheduling, the PDST from the memory execution unit 117 is fed through PDST multiplexer 220 into two-cycle CAM matching circuitry 230 (CAM2), which stores the first and second physical source operand tags PSRC1 and PSRC2. The incoming PDST is associatively matched with these source operand tags in the CAM 2 arrays. In this example, the PDST ROB$_6$ results in a match at entry 3 of the second source operand PSRC2 CAM 2 array, indicating that the second source operand of the ADD instruction will soon become available on the write back bus 120 from an execution unit. The resulting CAM match bit for entry 3 of the second source operand CAM 2 array is fed into a ready logic circuit 240. As mentioned above, in this example the first source operand (corresponding to eax and located at ROB$_5$) of the ADD instruction is assumed to be available. In this example, we assume that the availability of the first source operand is indicated by setting a source valid bit (S1V) for the first source operand of the ADD instruction in the reservation station 118. This source valid bit is also fed into the ready logic circuit 240. Using this information, the ready logic circuit 240 determines that a source operand is available for dispatch to the appropriate execution unit along with the corresponding instruction when the following logical equation is satisfied:

source ready=[(source valid bit) OR (CAM2 match bit) OR (CAM1 match bit)]

An entire instruction is ready for dispatch when this equation is true for all source operands and an execution unit capable of executing the instruction (as specified by the opcode) is available. (The CAM1 match bit will be described below.) A scheduler circuit 250 maintains information regarding which execution units are available.

In this example, both the first source valid bit and the second source CAM 2 match bit have been set. Consequently, the ready logic circuit 240 determines that the add micro instruction entry will soon have both of its source operands available so that the instruction may be dispatched if the integer execution unit 116 is also available. The ready logic circuit 240 signals the scheduler circuit 250 that entry 3 is ready. In response to this signal, the scheduler circuit 250 will schedule the ADD instruction for dispatch to the integer execution unit 116.

During the writing of the PDST by the memory execution unit 117, the PDST is latched in the CAM circuitry (latch not shown) and used by 1-cycle CAM matching circuitry (CAM1) 240 during the POTENTIAL BYPASS stage. The latched PDST is associatively matched with the first and second source operand tags (PSRC1 and PSRC2) that are stored in the CAM1 240 arrays. The CAM1 match again results in a match for the second source operand (PSRC2) of entry 3. Note that the POTENTIAL BYPASS (BP) stage of the add micro instruction is timed to coincide with the writing back of data from the load micro instruction. The match bit resulting from the second source CAM1 match is used to control an EU bypass multiplexer 260 in the integer execution unit 116. In response to the CAM1 240 match bit, the EU bypass multiplexer 260 routes the result data directly from the memory execution unit 117 to a source operand input of the integer execution unit 116. Thus, upon receiving the dispatched add micro instruction, the integer execution unit 116 has all its source operands immediately available. As shown in FIG. 2, the CAM1 240 match bits are also fed into write enable inputs of the RS 118 to enable the write back of result data to the appropriate source data fields in the reservation station entries for which the PDST of the write back data resulted in a match. The match bit also write enables the source data valid bit entries (S1V or S2V) to receive a write back valid bit. For a number of operations, an execution unit writes the write back data valid bit at the same time that it writes result data into the corresponding source data field. For example, an execution unit performing a load operation would write back a data valid bit with the data, and not at the earlier time of the CAM match, in order to ensure that data is not prematurely deemed valid before any potential cache misses are resolved. On the other hand, when the result of an instruction, such as an ADD, is inherently certain to be valid, then the valid bit may be preset to valid. Therefore, the valid bit would be set as soon as the corresponding entry is write enabled by the CAM1 240 match bit.

The foregoing discussion illustrates how the ADD micro instruction is made ready for dispatch and thereafter dispatched with all its source operands valid. The determination of the readiness of the operations dependent upon the ADD instruction will now be discussed. As mentioned above, the execution unit executing a dispatched instruction provides the PDST two cycles before writing back the result data. The PDST is then used to determine the readiness of instructions that depend upon the data to be written back. Here, the ADD instruction is a single cycle uop, i.e., the execution/write back stage occurs in a single processor cycle. The ADD is writing back data with a PDST=$ROB_7$, which represents the logical destination register eax. It is desired to achieve back-to-back scheduling of single cycle uops, such as the ADD instruction, and their dependent instructions. This requires that at least one dependent instruction implement its ready pipestage at the same time that the ADD instruction is being dispatched.

However, this mechanism encounters a potential problem when the instruction writing back the data is a single cycle uop. Given the description above, the PDST ($ROB_7$) for the ADD instruction is returned two cycles before the write back. But in this case for the ADD instruction (as shown in FIG. 5), two cycles before write back occurs before the ADD instruction is even dispatched. It is impossible for the execution unit 116 to write back the PDST for the ADD instruction before the ADD instruction is even dispatched. This is the case because it is the act of dispatch that informs the execution unit of the PDST ($ROB_7$) in the first place. Therefore, the present invention utilizes an alternate way to provide the PDST to the CAM2 and CAM1 matching logic. This alternate way is to read the PDST for the ADD instruction directly from the RS 118 before the ADD instruction is dispatched. This is referred to as the early read operation of the present invention.

The present invention provides a mechanism for the early reading of the PDST of a dispatching single-cycle instruction (the early read operation) so that the PDST may be read upon the assertion of a schedule line associated with the dispatching instruction and supplied before the instruction is actually dispatched. The details of this early read operation will be discussed in detail further below. The PDST is written into the RS 118 during allocation of the uop to the RS 118. Thus, in this example, after the ADD instruction has been determined to be ready, it is already known that the PDST in the ADD reservation station entry represents the PDST of data that will be written back after execution of the ADD instruction. Accordingly, the present invention provides the PDST bypass multiplexer 220 with the PDST from the ADD uop reservation station entry, and from the multiplexer 220 this PDST is supplied directly to the CAM2 230 match circuitry of the first and second source operands, thereby bypassing the round trip of the PDST from the third reservation station entry to the IEU 116 and back again. From the CAM2 230 circuitry, the PDST is latched into the CAME circuitry 240. It is important to realize that the PDST for the ADD is supplied (according to the present invention) in advance of the dispatch cycle of the ADD instruction (see further the discussion with respect to FIG. 7).

To reiterate, the multiplexer 220 provides the PDST directly from the RS 118, and not from an execution unit, when a single cycle uop is to be dispatched. The multiplexing function of the multiplexer 220 may be controlled through a number of methods. First, only those execution units that execute multiple cycle uops are configured to transfer a PDST Valid bit (PDSTV) along with the PDST two cycles before write back. As shown in FIG. 2, the PDSTV bit acts as the input selector control of the PDST bypass multiplexer 220. If the PDSTV bit is set (representing a multicycle uop), then the PDST issued by the execution unit is routed to the CAM2 230 circuitry. The PDSTV bit is transferred along with the PDST itself to the CAM2 230 in order to enable and initiate the CAM matching process. If the PDSTV bit is not set (representing a single cycle uop), then the PDST from the add uop instruction entry of the RS 118 is routed by the multiplexer 220 to the CAM2 230 circuitry, thus bypassing the roundtrip of the PDST through an execution unit. The multiplexer 220 also routes a "single cycle bit" from the RS 118. The single cycle bit, like the PDSTV bit, is used to enable and initiate CAM matching. The single cycle bit is provided as part of the uop opcode during the process of decoding a macro instruction into single cycle uops. An alternative method (not shown) of controlling the PDST bypass multiplexer 220 uses the single cycle bit alone as the multiplexer input selector control.

In this example, the bypassed PDST of the ADD instruction is fed into the CAM2 230 circuitry to identify dependent instructions. The CAM2 match of the PDST=$ROB_7$ results in matches for the second source operand of entries 4, 7 and 11. The match bit at those entries for the second source operand, along with the already set source 1 valid (S1V) bits for those entries indicates that the subtract, XOR and AND operations are ready for dispatch as soon as execution units are available to execute those functions.

Ideally, if different execution units were provided for each operation, all three dependent operations could be dispatched simultaneously. However, in an alternative embodiment, the subtract function and the logical XOR and AND functions may only be executed by the same execution unit, i.e., the integer execution unit 116. Thus, all three operations cannot be dispatched to the IEU 116 at the same time, but rather must be scheduled for dispatch one after the other. The scheduler 250 selects the order of dispatch according to a number of algorithms. The three dependent instructions may, for example, be scheduled randomly, sequentially, or in a first-in-first-out (FIFO) order, or some variation thereof. In this example, the scheduler 250 selects the micro operations to be dispatched in first-in-first-out order as shown in FIG. 5. Because the subtract function is followed by the exclusive OR and logical AND functions, respectively, in the in-order program code, those instructions were issued to the reservation station in that order (from oldest to youngest). Thus, based on the FIFO algorithm scheduling, the subtract uop is dispatched first. The scheduler 250 will be described in more detail below.

As before, the PDST has been latched, and is used by the CAM1 circuitry 240 to control the EU bypass multiplexer 260 of the IEU 116 and the write enables of the reservation station source data entries. The match bit from the second source operand CAM1 240 implements an internal bypass of the result data from the execution of the ADD instruction in the IEU 116 back to the same IEU 116 for use as the second source operand for execution of the SUBTRACT instruction in the IEU 116.

In this case, because the PDST of the ADD instruction also resulted in CAM1 matches for entries 7 and 11, the result data from the ADD instruction is written into the second source data fields (SRC2 DATA) of the exclusive OR and logical AND operations, the write enables for those fields having been asserted by the match bit from second source operand CAM1 240.

Fortuitously, the CAM 1 match performed during dispatch of the subtract operation can be used to determine again the readiness of instructions for dispatch. This obviates the need to provide storage for the previously determined ready state (which is another embodiment of the invention). The CAM1 match determines that the XOR and AND operations are ready. However, the CAM1 match bit for the SUBTRACT instruction is not used to determine again the readiness of that instruction because that would result in multiple dispatches of the SUBTRACT instruction. Thus, although the subtract operation uses the CAM1 match bit for controlling the EU bypass multiplexer 260 and the write enables of the RS 118 entries, the ready logic for the entry containing the subtract operation is disabled by the scheduler 250 after scheduling that instruction for dispatch. This operation is performed by resetting an entry valid bit (not shown) in the RS 118, which is fed to the ready logic 240 for each entry. In general, the ready logic for any instruction entry is disabled after it has been scheduled to prevent multiple dispatches of the same instruction.

After the XOR and AND operations have been found ready, the scheduler 250 arbitrates between t he two instructions and selects the XOR entry for dispatch according to the FIFO algorithm used in this example. The XOR entry is then dispatched. Because the result data WRITE BACK stage of the add uop coincides with the SCHEDULE stage of the XOR uop, the result data is already stored in the XOR SRC2 DATA by the entry at the time the XOR uop is dispatched, thereby providing the source operand data to the IEU 116. Because the previous result data is available from the RS entry, the EU bypass multiplexer 260 is disabled by the reservation station after the result data has been written into the RS in order to prevent bypassing.

Moreover, during the write back of the result data after execution of the ADD micro instruction, along with the result data that is written into entries of the reservation station 118, corresponding source valid bits are set in those entries using the write back data valid bit described above. During write back, the data from the IEU 116 is also written into the ROB 108 via the write back bus 120. All subsequent instructions, e.g., the logical AND micro operation, then use the source valid bits, which are fed into the ready logic 240, to determine whether a source operand is ready for dispatch.

Figure 6:
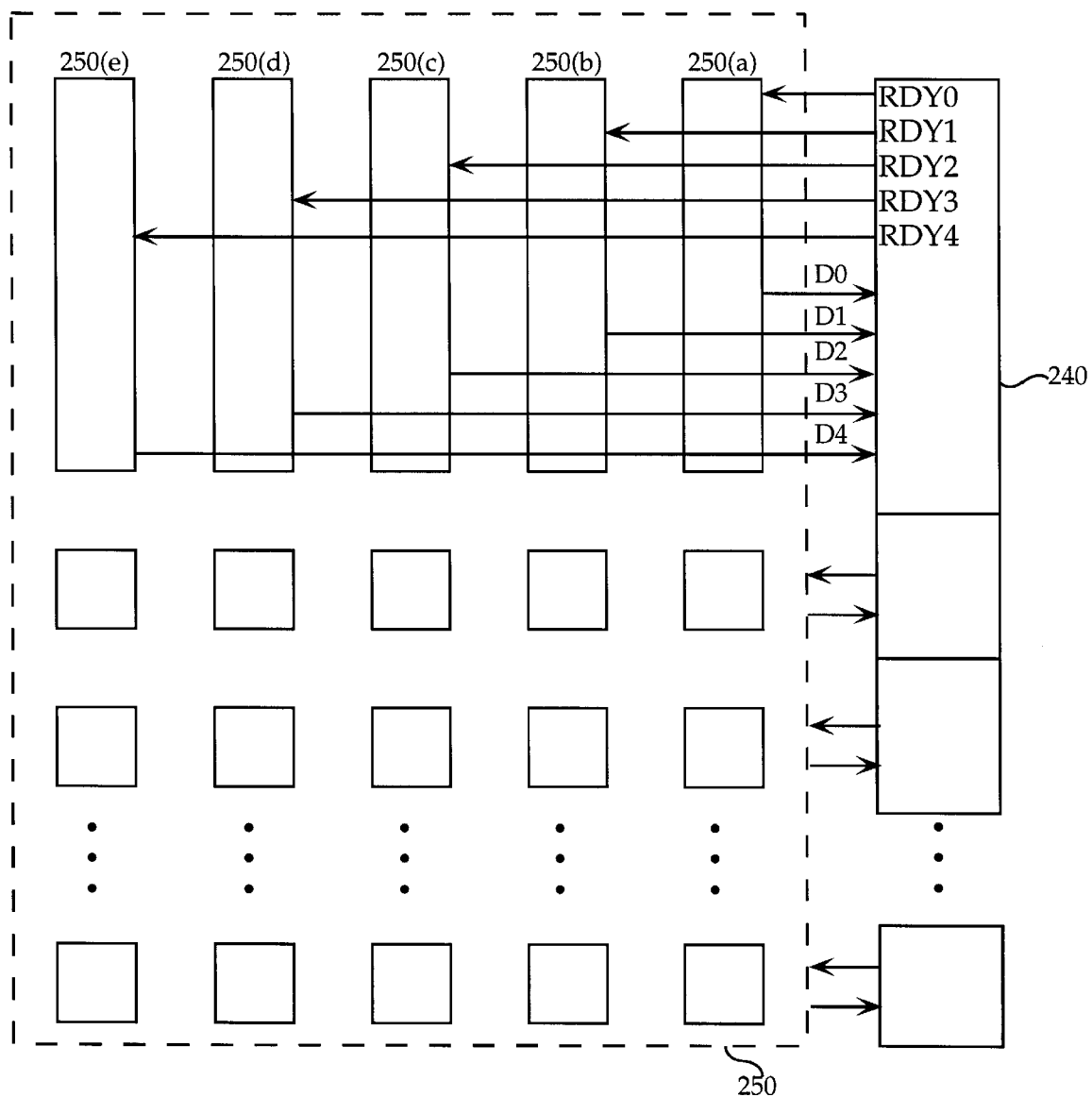
FIG. 6 illustrates the scheduler-to-ready logic interface utilized by the present invention.

Refer to FIG. 6 which illustrates in more detail the scheduler 250 to ready logic 240 interface of the present invention (of FIG. 2). The present invention includes a separate scheduler (250(a)–250(e)) for each execution unit of the present invention. As shown in FIG. 1 there is an integer execution unit 116 and a memory execution unit 117 and others within the processor. In one embodiment, the processor contains five execution units in total (some for performing integer, floating point and other computations) and each execution unit has an associated scheduler.

As shown in FIG. 6, a particular entry (e.g., instruction) of the reservation station 118 may become ready to be scheduled on any one of the schedulers because a given instruction may execute on any given and available compatible execution unit. Therefore, each entry of the reservation station transmits a separate ready line to each individual scheduler (250(a)–250(e)). The ready line generation for entry 0 of the reservation station is shown for all five schedule lines (RDY0–RDY4). Although any given instruction may utilize any of the five execution units, specific instructions are limited to certain execution units. Therefore, the purpose of the ready lines, for each entry, is to inform the schedulers to what possible execution units a given instruction can be dispatched. It is appreciated that each of the twenty entries of the reservation station generate five ready signals. It is possible that two or more ready signals, for a given entry, can be asserted assuming that that entry may execute on two or more execution units.

The schedulers decide which of the ready instructions will execute on which execution unit. The schedulers, for each entry of the reservation station 118, send five dispatch signals (D0–D4) back to the ready logic 240 of the reservation station 118. The dispatch lines for entry 0 are illustrated in FIG. 6 and it is appreciated that five equivalent lines are provided for each other entry 1, 2, . . . 19 of the reservation station. Each dispatch signal refers to a separate execution unit that has been selected by the applicable scheduler. The dispatch signals D0–D4 are individually generated by schedulers 250(a)–250(e), respectively. These dispatch signals are asserted during the schedule stage for a given instruction and are often referred to as "schedule signals" for a given entry of the reservation station. For a given entry of the reservation station, only one of the five dispatch signals will be asserted at any given time. For instance, if entry 0 is scheduled to execute over execution unit 0, then the dispatch line (D0) for entry 0 will be asserted and forwarded from the scheduler 250(*a*) to the reservation station entry zero. In sum, a given entry of the reservation station has five associated dispatch (schedule) lines and only one can be asserted at any given time. These schedule lines (D0–D5) are used during the early reading of PDSTs from the reservation station for scheduling instructions that follow single cycle uops, as will be discussed immediately below.

Referring back now to FIG. 2, the early read of the RS, as discussed below, supplies a PDST from the RS to one input of the PDST multiplexer 220, while the other input arrives from an execution unit. Except for the PDST column of the reservation station memory array 118, all memory storage elements are based on a static memory storage technique that utilizes a pre-charge line supplied by the system clock. Therefore, data becomes available (e.g., valid data) from these columns at the rising edge of the clock signal. This type of clocked memory is utilized by the present invention reservation station because it is generally less complicated (logically) and consumes less substrate space as compared to memory storage techniques that are not clock based. As referred to herein this memory storage technique is called a dynamic read because it involves the clock edge. It is appreciated that the early read operation of the present invention is utilized for back-to-back scheduling of instructions that are data dependent on single cycle instructions in order to achieve maximum processing throughput.

The PDST column of the reservation station of the early read operation of the present invention is implemented in SRAM and is not a dynamic read circuit and as such is not clock based. Therefore, the PDST storage arrays may supply data within a given clock cycle before the rising edge of the next clock cycle. As referred to herein the memory storage technique for the PDST column is referred to as the static read. The details of both the dynamic read memory cells and the static read memory cells of the present invention will be explained below.

Figure 7:
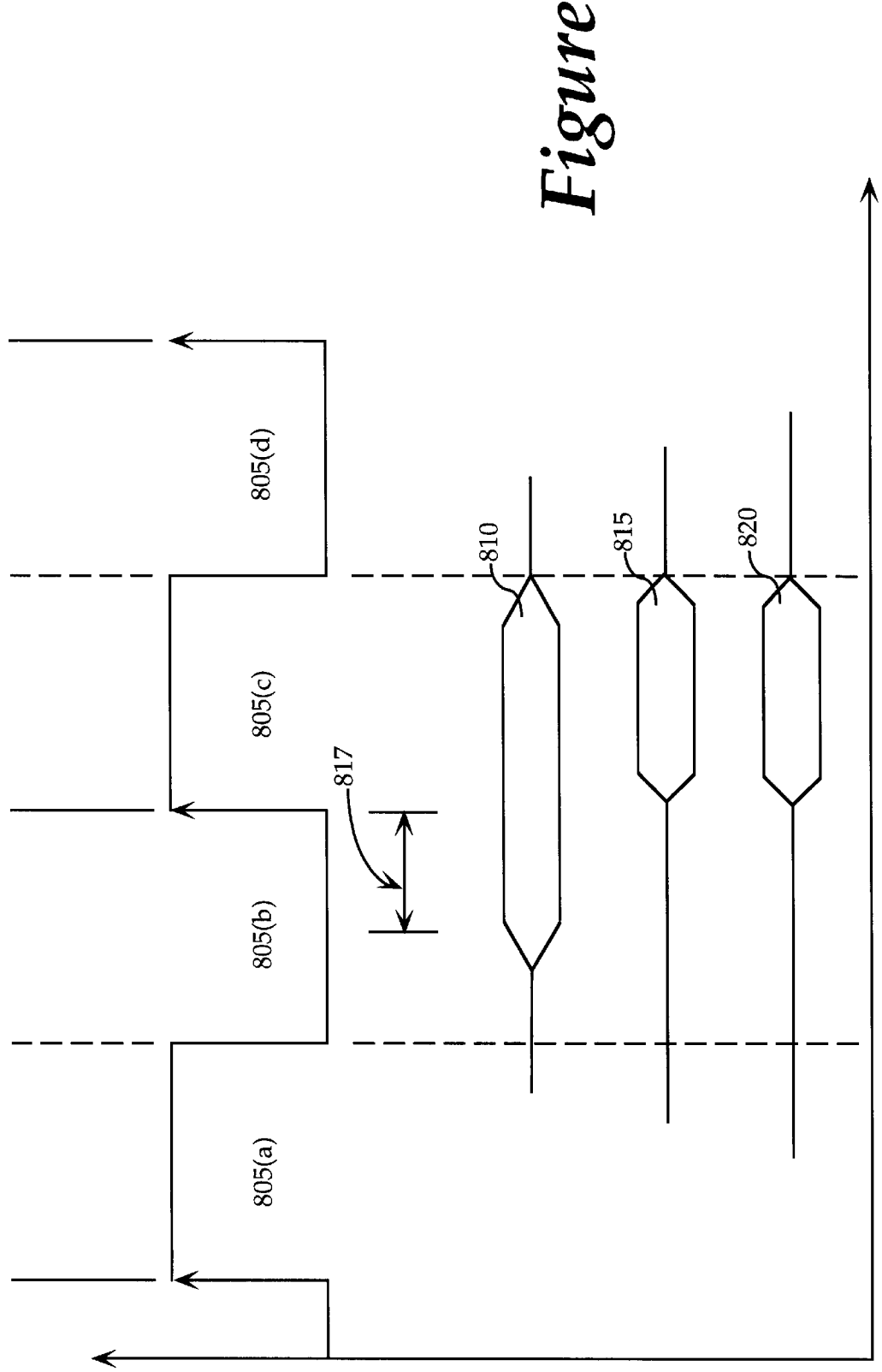
FIG. 7 is a timing diagram of the early read operation performed by the present invention.

Refer now to FIG. 7 and FIG. 4. As discussed above with reference to the pipeline stages of the ADD instruction, the present invention must perform an early read of the reservation station in order to supply PDSTs (ROB$_7$) in time for the ready determination of the SUB instruction. The circuitry to perform this early read operation is triggered based on the assertion of the schedule line of the ADD instruction for the particular execution unit selected for the ADD instruction. Therefore, the read of the reservation station array for the ADD's PDST begins within the schedule stage of the ADD pipeline. If this read operation were dynamic (e.g., clock based) then the result of the read operation would not be supplied until the next rising edge of the clock, which would be at the start of the dispatch stage of the ADD instruction (which is also the same time as the start of the ready determination stage of the SUB instruction). But this read of the ADD's PDST would be much too late for the ready determination stage of the SUB instruction because the SUB instruction needs the PDST information before the start of its ready determination stage.

It is appreciated that other alternative embodiments of the present invention for providing a non-clocked read function include a self-timed clock circuit to supply the PDST information and also a clocked skewed circuit to supply the PDST information. The above two alternative embodiments provide output information not in coincidence with transitions of the system clock.

Refer to FIG. 7 which illustrates the timing more clearly. Shown across clock cycles 805(*a*)–805(*d*) are the READY, SCHEDULE, DISPATCH, and potential BYPASS stages for the ADD instruction. During cycle 805(*b*), one of the five schedule lines for the ADD instruction will become valid during timing duration 810 as a scheduler selects an execution unit for the ADD instruction. This will cause the present invention static read circuitry to supply the PDST from the reservation station associated with the ADD's entry. This occurs at duration 817. During the dispatch of the ADD instruction at 805(*c*) a dynamic read operation 815 is performed by the present invention of the source data (if valid) within the reservation station in order to supply the execution unit with the required data. If the PDST column of the reservation station were implemented as a dynamic read memory (e.g., clocked memory) then the PDST would not be supplied until the start of cycle 805(*c*), which would be too late for the SUB's ready determination stage. Therefore, by providing a static read implementation, the present invention is able to supply the ADD's PDST during cycle 805(*b*) in time for the SUB's ready determination stage. At timing duration 820, the present invention performs a CAM2 match of the ADD'S PDST against the sources of the valid entries of the reservation station. It is here that the ready determination for the SUB instruction is performed.

Figure 8:
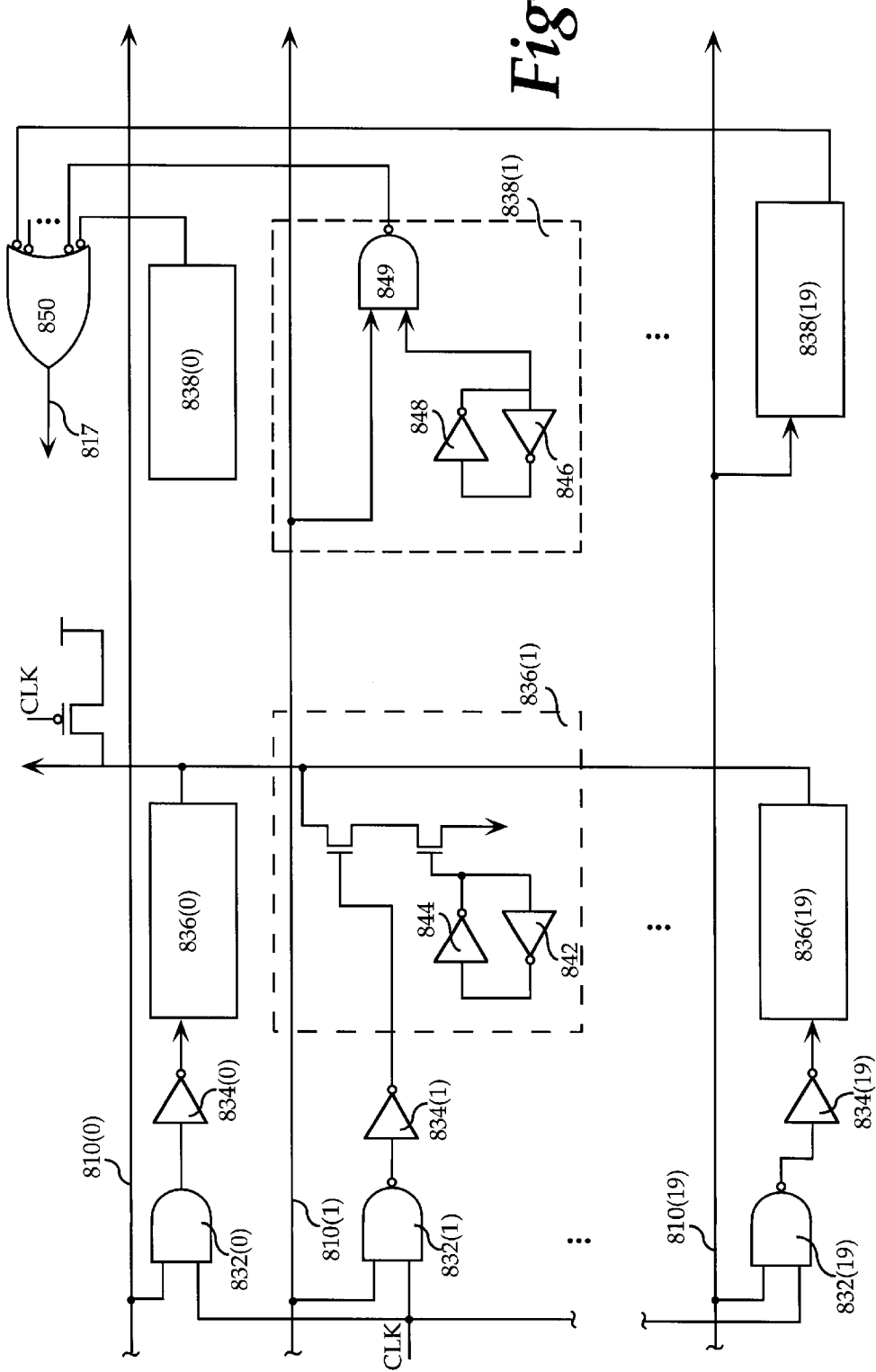
FIG. 8 illustrates the memory storage circuitry used to implement one embodiment at the early read operation performed by the present invention.

FIG. 8 illustrates in detail the static (not clocked) and dynamic (clocked) memory storage implementations of the reservation station 118 of the present invention for a single bit of the PDST column and for a single bit of another column, either the SRC1 DATA or SRC2 DATA column or any other column that contains information that is not speed critical. The circuitry illustrated and discussed herein is replicated (1) for each bit of the PDST column, and also (2) for each of the five schedule lines for each entry of the reservation station 118. Further, since multiple instructions may be scheduled at the same time, the entire circuit as discussed above is replicated for each possible PDST supplied from the reservation station that is associated with a scheduled instruction. Therefore, FIG. 8 illustrates the logic for a given PDST read from the reservation station, for a given schedule line and for a given bit within the given PDST.

The clocked memory storage of the reservation station (e.g., the SRC1 and SRC2 DATA columns) is now explained. Line 810(0) represents the schedule line (D0) for a given execution unit (EU0) for entry 0 of the reservation station. Line 810(1) is the schedule line for EU0 for entry 1 and likewise line 810(19) is the schedule line for EU0 for entry 19. Only one entry of the RS 118 can be scheduled to execute on a given execution unit at any given time, so only one line of 810(0)–810(19) is asserted at any given time for a given execution unit. The circuitry for each entry of the reservation station is analogous to that of entry 1, which will be described in detail herein. The schedule line 810(1) becomes asserted during timing duration 810 (of FIG. 7) and indicates that entry 1 is scheduled to execute over EU0. This line 810(1) is propagated to NAND gate 832(1) and the output of the system clock (clk) (of FIG. 7) is fed into the other input of NAND gate 832(1). The output of the NAND gate 832(1) is fed to inverter 834(1) and then to dynamic memory bit 836(1) which is composed of two transistors and inverters 844 and 842 configured to retain a memory bit in a well known fashion. The write ports to the memory bits are not shown and may be implemented in a variety of well known fashions. The bit 836(1) represents a bit within the SRC1 or SRC2 DATA columns of entry 1 of the RS 118. The memory bit is coupled to output line 815, which is precharged high by the clock signal applied through transistor 841; as such, and with respect to the NAND gate 832(1), the output of the dynamic memory cell 836(1) is in coincidence with the clock signal. As discussed above, this circuit is replicated across each bit of the source data columns to supply the data for a dispatched entry (here entry 1). The data associated with bit 836(1) will be made available over line 815 in coincidence with the rising edge of the clock at the start of cycle 805(c) (of FIG. 7) when the instruction in entry 1 is dispatched, and the data read from these memory cells is therefore "clocked" with this clock. Line 815 is inverted and the data is read out of the inverter as part of a weak sustainer circuit. This is the dynamic read implementation of the present invention. The data output of the dynamic read operation for the source data columns supplies the execution units.

It is appreciated that the above circuitry is replicated for each entry of the reservation station 118. The output of the bit 836(1) is tied to a precharged line 815 which is precharged by transistor 841 and the clock signal in a well known fashion. The bit data is supplied over line 815, ultimately from the reservation station to the EU0 when entry 1 is dispatched for execution. It is appreciated that the present invention utilizes the dynamic read (clock based) memory read technique for all columns of the reservation station 118 except for the PDST column.

Refer still to FIG. 8. The present invention also includes a static read cell that is not clock based and does not output information in coincidence with the system clock. This non-clock based memory is used for storing the PDST information. The schedule line 810(1) is fed into static memory call 838(1), which is composed of two inverters 848 and 846 configured to retain a memory bit in a well known fashion. The schedule line is fed into one input of NAND gate 849 and the other input of the NAND gate 849 is from the memory bit configuration. When the schedule line 810(1) is asserted, the memory bit of storage cell 838(1) is supplied into one input of a NOR gate 850. The same is true for all entries of the reservation station. The output of cells 838(0)–838(19) are sent to NOR gate 850 (or alternatively to a tree of gates that comprise a NOR function). The output of NOR gate 850 is inverted and sent over line 817' and ultimately sent to the CAM2 logic used to compute the ready determination of the next instruction. The outputs 817' of the NOR gates 850 for each bit of the PDST is fed to an input of MUX 220 (FIG. 2). The logic shown in 838(1) for entry 1 is replicated for each bit required to contain the PDST information. Further, the logic is replicated for each entry of the reservation station. Finally, because the present invention may be implemented as a superscalar microprocessor, the total memory circuit is replicated for each PDST that needs to be read out from the reservation station early.

Since the schedule line 810(1) is asserted during cycle 805(b) (of FIG. 7) and since the cell 838(1) does not require the clock to supply its data, the bit from cell 838(1) may be supplied in advance of the rising edge of the clock at the start of cycle 805(c) which is in time for the ready determination of the next instruction. The static read cell does not supply its information clocked (e.g., in coincidence with the clock transitions but rather is responsive to the schedule line. The static read implementation of cell 838(1) is used for the PDST column of the reservation station 118. Cell 838(1) represents but one bit, and thus the logic of FIG. 8 is replicated for each bit of the PDST column for entry 1 and for the other entries as well. The entire resultant circuit is also replicated for each PDST that must be read from the multiple instructions that can be dispatched at once. Therefore during interval 817 (of FIG. 7) the PDST from the reservation station of entry 1 is supplied over line 817' in advance of the next rising edge of the clock.

One alternative to the above early read operation of the present invention may include the insertion of an extra clock cycle into the pipeline stage of the SUB instruction (that would delay the ready determination stage) so that a dynamic read of the PDST column could be performed in time for the ready determination stage of the SUB instruction. However, this would not yield the maximum throughput for back-to-back execution of single cycle instructions and thus is not an acceptable solution.

On the other hand, the present invention's early read of the PDSTs of the reservation station using non-clocked static memory allows back-to-back execution of single cycle instructions that may be data dependent. The PDST from the ADD instruction is supplied to the ready determination state of the SUB instruction and the data returned by the ADD instruction will be routed to the input of the execution unit scheduled for the SUB instruction via the MUX 260 (in the fashion as discussed above). The present invention thus allows the SUB instruction to fully execute while only consuming one clock cycle longer than the processing time of the ADD instruction, even though the SUB instruction is data dependent on the ADD instruction. This is maximum throughput for back-to-back scheduling of instructions that are data dependent on a single cycle instructions.

Figure 9:
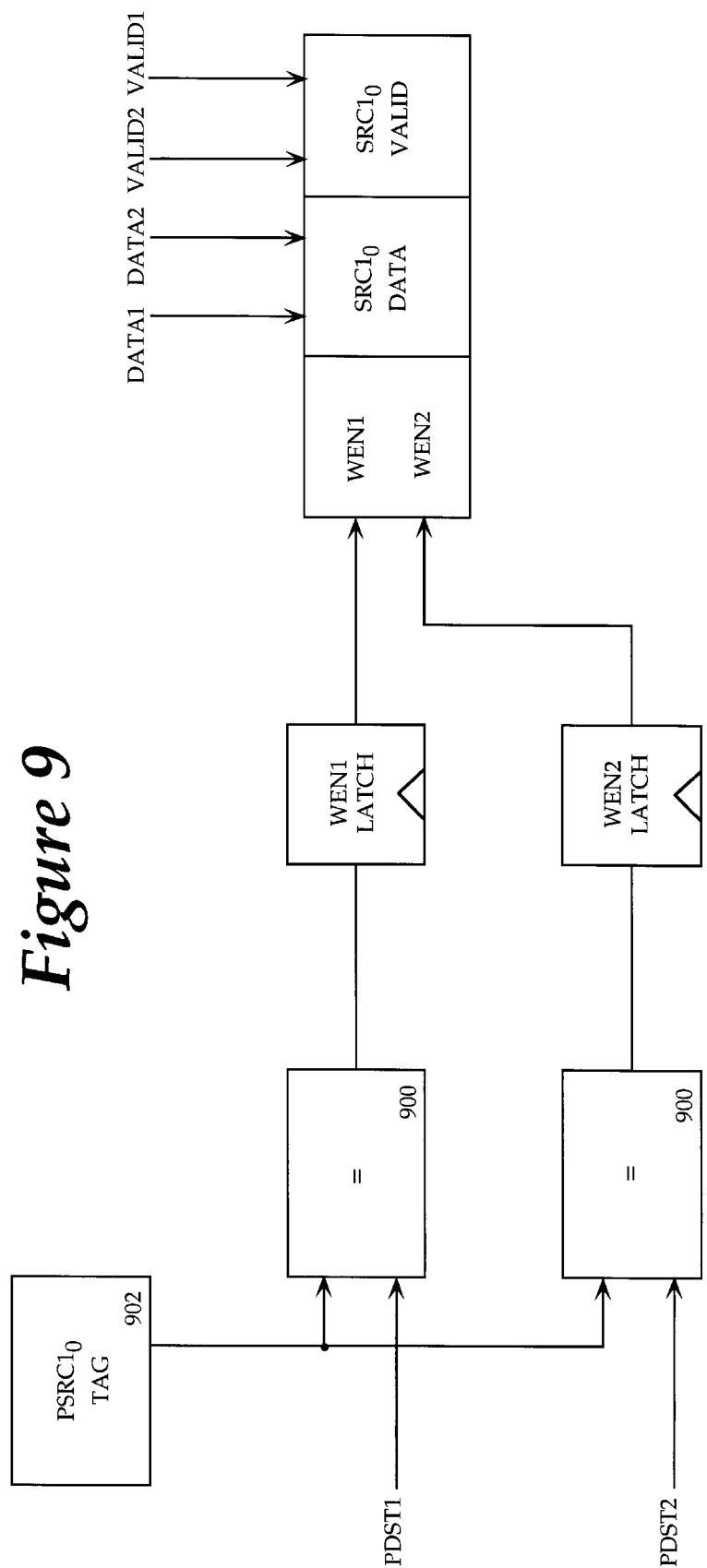
FIG. 9 illustrates a multi-ported embodiment of a content addressable memory utilized by the present invention.

It should be kept in mind that the preferred embodiment of the present invention is a superscalar microprocessor, i.e., multiple instructions may execute within the same processor clock cycle. Thus, in the example of FIG. 2, both the first and second operands may become available at the same time due to the simultaneous execution of multiple instructions providing both operands. To accommodate the superscalar case, each CAM of FIG. 2 may represent a multi-ported CAM that receives a PDST from each micro instruction that will be writing back its result. FIG. 9 illustrates a multi-ported embodiment of a CAM for the first source operand of the first RS entry. Each incoming PDST (PDST1 and PDST2 in this example) is input to a corresponding comparator 900 so that multiple PDSTs are compared to the same source operand tag 902. Each comparator 900 and its resulting match bit are thus associated with a particular PDST and its source (e.g., execution unit). Similarly, each RS entry includes a number of write enables (WEN 1 and WEN 2), each for enabling the receipt of write back data (RESULT DATA1 and RESULT DATA2, respectively) and a valid bit (VALID1 and VALID2, respectively), from the associated source. Consequently the match bits enable the writing of data and valid bits to the correct source operand of the correct RS entry from the correct source.

The present invention has been described as a means for back-to-back scheduling of dependent instructions under the assumption that all but one source operand is available to each instruction. This condition has been illustrated by setting the source valid bits corresponding to the available operands. A source valid bit may be set using a number of methods, including use of the write back data valid bit and the results of CAM matching as described above. There are several other mechanisms available for setting the valid bit when source data becomes available before a dependent instruction is written to the reservation station. The setting of source valid bits for multiple sources may be done by any combination of these methods. It is important to note that the earlier the valid bits can be set, the earlier the scheduling of the associated instructions may commence. Thus, where for certain types of source data it is possible to write the valid bit earlier than for other types of sources, a mechanism for implementing this is desirable to facilitate early scheduling.

Figure 10:
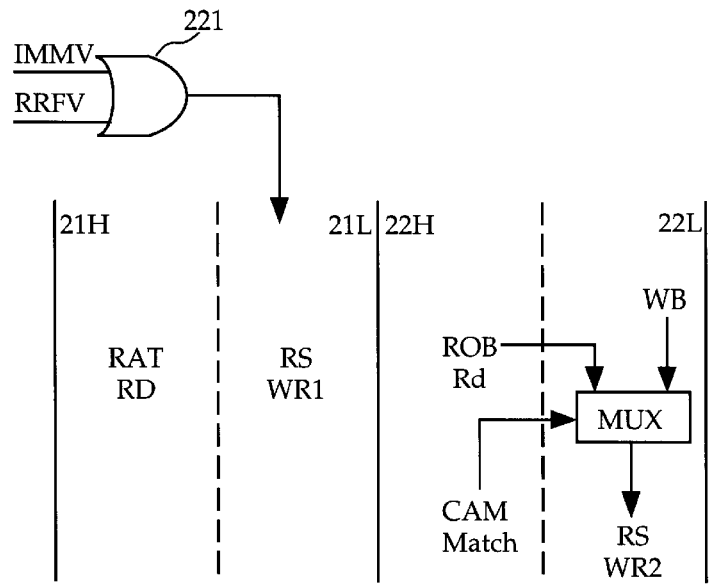
FIG. 10 illustrates a portion of the pipeline stages of the present invention microprocessor for allocating instructions to a reservation station.

FIG. 10 illustrates a portion of the pipeline stages of the pipeline executed by the out-of-order processor of the present invention which are pertinent to the scheduling of the dispatch of data-ready instructions. Before describing the relevance of the pipeline stages, it is important to note the distinction between several types of source operands. It was described above that one type of source data will be propagated to the reservation station over the write back bus 120 as a result of a previously executed instruction which provides data needed by a data dependent instruction. Another type of operand is the "immediate value", e.g., the second value in an instruction such as 'ADD (eax, 1)'. Immediate values may come from the instruction decoder 106 with the instruction, or be hardwired within the processor for special functions. Immediate values are guaranteed to be accurate because they have no data dependencies on instructions that have yet to be executed.

Another type of source operand for an instruction may be the result of an operation that has already been executed and retired. Retired data are maintained in the real register file 110 which contains the committed state registers that hold the committed state of the architectural registers of the original stream of instructions. Like immediate values, committed result data values in the committed state registers always provide valid source data. Finally, some source operands are the result of operations that have already been executed but have not yet been retired. They may still be speculative until further dependencies are resolved, and are not qualified for being committed to architectural state registers. These source operands are stored in the ROB 108.

It can be appreciated that for immediate sources and retired sources, advantage can be made of the guaranteed nature of this data. In FIG. 10, two stages of the allocation pipeline are illustrated, stages 21 and 22. It can be seen that the allocation pipestage 22 overlaps with the reservation station pipestage 31 (the ready/schedule stages). The dashed lines separate the rising and falling clock edge portions of the cycle. As was described above, the setting of the source valid bit for write back data is received in pipeline stage 22. Similarly, when a source is in the ROB 108, not yet having been retired, the RAT 114 sends the PSRC of the source operand to the ROB, which reads the result and passes it to the RS, again setting the source valid bit in pipestage 22. In contrast, the source data valid bit for either immediate values or retired data may be written one cycle earlier because of its guaranteed nature, and because of the location of the information indicating the validity of this data. The valid bits for immediate operand data may be provided directly from the instruction decoder 106 to the reservation station 118. Additionally, the RAT 114 maintains a retirement valid bit (RRFV) for indicating data that has been retired. When data is retired from the ROB to the RRF, the RAT 114 is scanned for the PSRC and its RRFV bit is set.

For sources that are immediate values or are retired in the RRF 110, the source valid bit is set upon initial allocation during pipestage 21L. The source ready logic implements OR logic 221 for the two different valid bits, the immediate valid bit (IMMV) from the instruction decoder 106 and the RRFV bit from the RAT 114 and sets the source valid bit if either of those is valid. By doing this, the RS 118 is able to immediately ready detect and schedule entries whose sources are immediate data or located in the RRF 110 in the reservation station pipestages 31H and 31L. The early setting of the source valid bit is provided to the entry ready logic of the reservation station. The RS 118 is able to schedule and dispatch micro operations one clock earlier than otherwise would be possible if the valid bits were to be written exclusively during pipeline stage 22. The source valid bits for immediate values and retired values are set early, during pipestage 21, to facilitate early scheduling of dispatch from the reservation station 118. However, data corresponding to those sources is not actually written into the RS until pipeline stage 22. It can be seen from FIG. 10 that the ROB valid bit is only written during pipestage 22L.

Figure 11:
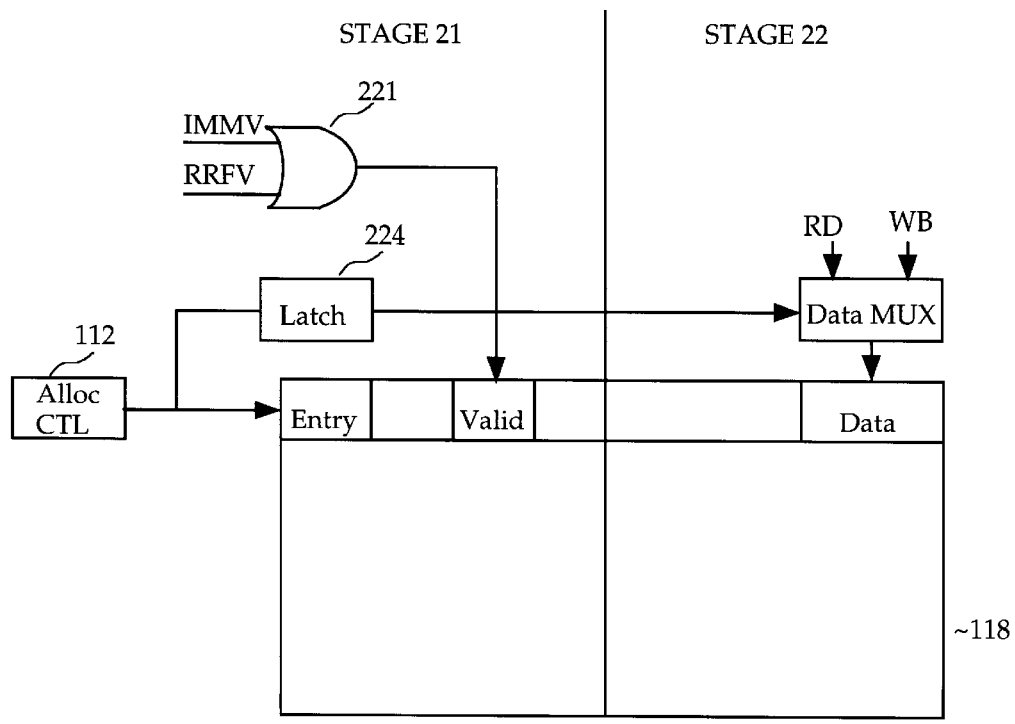
FIG. 11 illustrates the logic for writing data and validity information into the reservation station buffer of the present invention microprocessor.

FIG. 11 illustrates a simplified representation of the reservation station 118. In order for the valid bit to be set the data array of the reservation station for the given entry must have its write enable activated. In this situation, the write enable is controlled from the allocator 112 which for the given entry enables the writing of the valid bit when either an IMMV or RRFV is detected by the OR logic 221. Further, this write enable signal is delayed for one clock cycle by latching logic 224 to provide a write enable signal to the RS data field for the same entry one clock cycle later to provide for the actual writing of the data for that entry. The latching logic 224 may be provided by a master slave flip-flop or latch.

Because in some circumstances it is possible to have the same PSRC for different source data (one could be an address in the ROB and the other could be an address in the RRF), it is necessary that a priority scheme for the write enables be implemented. Logically, immediate data, retired data, write back data and ROB read data are multiplexed for a single entry such that the highest priority goes to either immediate data or retired data which is guaranteed, next to write back data and finally to ROB read data. This logical multiplexing is effectively implemented through exclusive write enable controls implemented on the RS. As noted, at allocation data can come from the ROB 108, the RRF 110, the write back bus 120 or be an immediate value. The ROB multiplexes ROB, RRF and immediate value data and delivers the result to the reservation station. The reservation station will then select either the write back data or the ROB multiplexed data. A CAM match results in the write back data being selected. To implement the above priority scheme, the early writing of the source valid bit for immediate or retired data disables the CAM matching.

It can thus be appreciated from the above discussion that the present invention fully takes advantage of the nature of both immediate data and retired data to provide for the earliest possible scheduling of the dispatch of instructions to appropriate execution units. This further facilitates the desire to have maximum throughput scheduling of dependent operations in a heavily pipelined processor.

Figure 12:
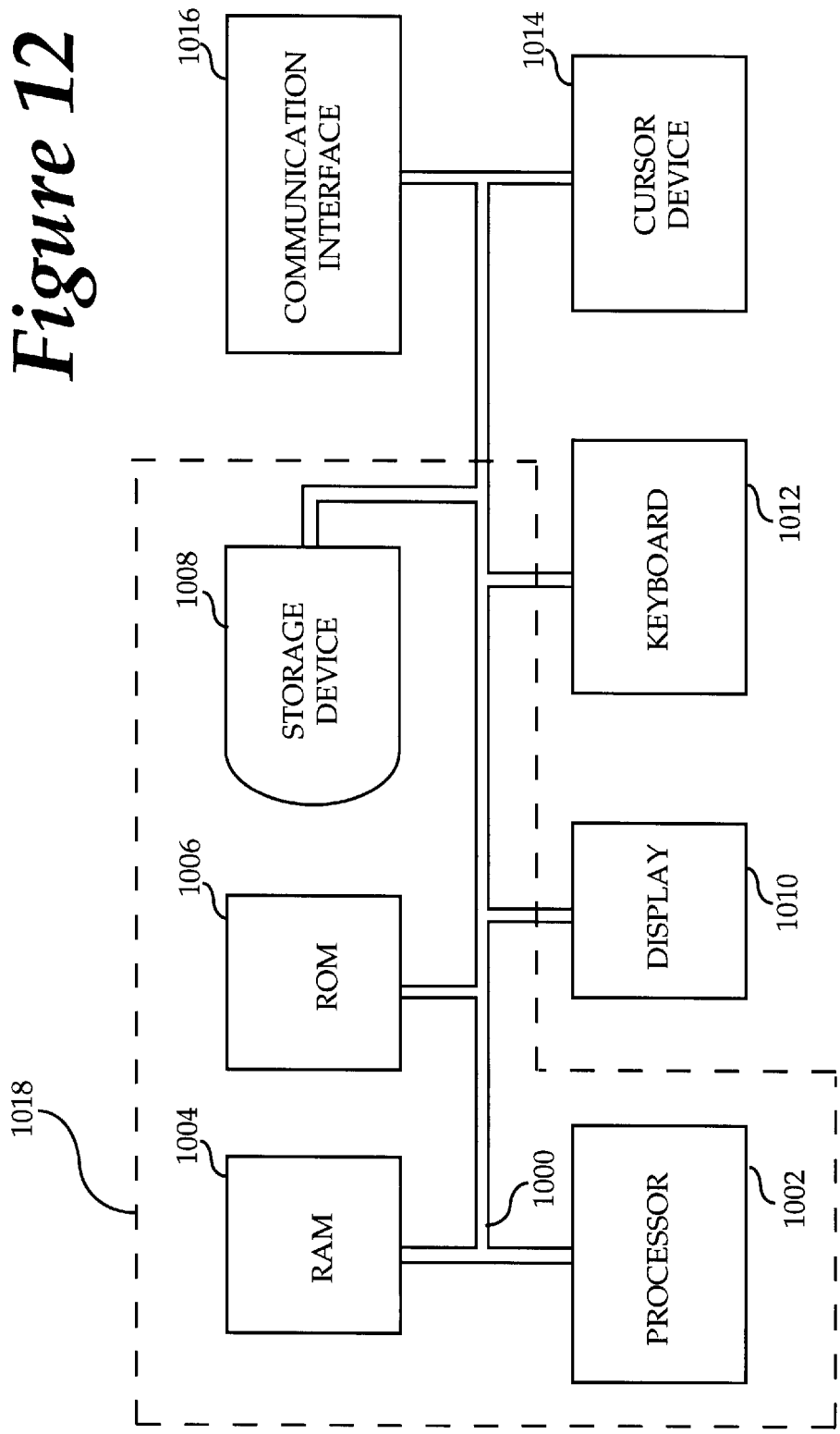
FIG. 12 illustrates a computer system incorporating the processor of the present invention.

The microprocessor of the present invention may be added to a general purpose computer system as shown in FIG. 12. Generally the computer system of th e present invention comprises an address/data bus 1000 for communicating information, a central processor 1002 coupled with the bus for processing information and executing instructions, a random access memory 1004 coupled with the bus 1000 for storing information and instructions for the central processor 1002, and a read only memory 1006 coupled with the bus 1000 for storing static information and instructions for the processor 1002. Also available for interface with the computer system of the present invention is a data storage device 1008 such as a magnetic disk or optical disk drive, which may be communicatively coupled with the bus 1000, for storing data and instructions.

The display device 1010 utilized with the computer system of the present invention may be a liquid crystal device, cathode ray tube, or other display device suitable for creating graphic images and/or alphanumeric characters recognizable to the user. The computer system may also contain an alphanumeric input device 1012 including alphanumeric and function keys coupled to the bus 1000 for communicating information and command selections to the central processor 1002, and a cursor control device 1014 coupled to the bus 1000 for communicating user input information and command selections to the central processor 1002 based on a user's hand movement. The cursor control device 1014 allows the network user to dynamically signal the two-dimensional movement of a visible symbol (pointer) on a display screen of the display device 1010. Many implementations of the cursor control device are known in the art, including a track ball, mouse, joystick or special keys on the alphanumeric input device 1012, all capable of signaling movement in a given direction or manner of displacement.

The computer system of FIG. 12 also contains an input/output device 1016 coupled to the bus 1000 for communicating information to and from the commuter system. The communication device 1016 may be composed of a serial or parallel communication port or may be a communication modem. It is appreciated that such a communication device 1016 may provide an interface between the bus 1000 and the user interface devices (keyboard 1012, cursor 1014, display 1010) of the computer system. In this case, the user interface devices will reside within a terminal device which is coupled to the communication device 1016 so that the processor 1002, the RAM 1004, the ROM 1006 and storage device 1008 may communicate with the terminal. The components 1002, 1004, 1006 and 1008 may be implemented on a single board or a computer chassis 1018, which is then coupled by a bus 1000 to the other components of the computer system.

It will be appreciated that various modifications and alterations might be made by those skilled in the art without departing from the spirit and scope of the present invention. For example, the use of the Intel architecture by the present invention is but one implementation. The present invention applies to other processor designs and instruction sets, as well. Further, the present invention may be physically embodied in a variety of packages. The present invention may be built into one integrated circuit package or have its functionality spread over a number of chips, or be implemented by an emulator. Moreover, the invention may be constructed on chips of different materials, such as silicon or gallium arsenide. Finally, although the present invention allows speculative out-of-order execution and is superscalar, aspects of the present invention operate effectively within pipelined processors that perform neither speculative execution, out-of-order execution, nor superscalar operation. The invention should, therefore, be measured in terms of the claims which follow.

We claim:

1. In a pipelined microprocessor that includes a reservation station having a plurality of entries for buffering instructions, a method of instruction dispatch comprising the steps of:
   (a) allocating an instruction to said reservation station in a first clock cycle of said pipelined microprocessor;
   (b) storing source operand validity information associated with said instruction in said reservation station during said first clock cycle whenever a source operand of said instruction is an immediate value or an architectural state register value;
   (c) scheduling dispatch of said instruction in a second clock cycle of said pipelined microprocessor prior to data corresponding to said source operand being computed as a result of the execution of another instruction.

2. The method of claim 1 wherein step (b) comprises the steps of:
   maintaining in a register alias table validity information regarding source operands that are architectural state register values; and
   providing said validity information to said reservation station whenever said source operand of said instruction is one of said architectural state register values.

3. The method of claim 2 wherein step (b) comprises the step of:
   providing said validity information for immediate value source operands from an instruction decoder to said reservation station whenever said source operand of said instruction is one of said immediate value source operands.

4. The method of claim 3 wherein step (b) comprises the steps of:
   logically OR'ing validity information for a source operand from said register alias table and validity information for said source operand from said instruction decoder; and
   storing a source valid bit in said reservation station for any source operand for which the logical OR'ing results in a true condition, said source valid data comprising said source validity information associated with said instruction.

5. The method of claim 1 wherein step (b) comprises the step of:
   providing a write enable signal to said reservation station during said first clock cycle.

6. The method of claim 5 further comprising the steps of:
   latching said write enable signal;
   providing said latched write enable signal to said reservation station during said second clock cycle;
   writing data corresponding to said source operand into said reservation station during said second clock cycle after said instruction has been scheduled for dispatch.

7. A processor comprising:
   an execution unit for executing an instruction;
   a reservation station for scheduling dispatch of said instruction to said execution unit, said reservation station buffering said instruction until source operands associated with said instruction are determined available;
   a reorder buffer for buffering result data from said execution unit until said result data is ready for retirement to architectural state registers;
   a retirement buffer comprising said architectural state registers for storing retired result data;
   an instruction decoder for decoding an instruction stream and providing said instruction to said reservation station;
   an allocator for providing write enable signals to said reservation station to enable the writing of instructions and source operands to said reservation station; and
   a register alias table for storing information about said result data in said retirement buffer,
   said instruction decoder providing immediate value validity information to said reservation station during a first clock cycle when a source operand to said instruction is an immediate value, and said register alias table providing retired value validity information to said reservation station during said first clock cycle when a source operand to said instruction comprises a data value stored in one of said architectural state registers, said reservation station scheduling dispatch of said instruction prior to said source operands being computed as a result of the execution of another instruction whenever either said immediate value or said retired value validity information indicates that said source operands are valid.

8. The processor of claim 7 further comprising OR logic circuitry for receiving said immediate value validity information and said retired value validity information, said OR logic providing a valid bit for said source operand to said reservation station if said source operand is an immediate value or is data stored in one of said architectural state registers.

9. The processor of claim 8 wherein said allocator provides one of said write enable signals to said reservation station for said OR logic circuitry to provide said valid bit to said reservation station during said one of said first allocation clock cycle, said processor further providing a write enable signals latching means to provide said write enable signal to said reservation station during a second allocation clock cycle to provide for the writing of said source operand data to said reservation station.

10. A computer system comprising:
a memory subsystem for storing an instruction;
a system bus coupled to said memory subsystem to provide a data communication path for said computer system;
a processor coupled to said system bus, said processor decoding said instruction into at least a first micro-instruction and having a reservation station for scheduling dispatch of micro-instructions, said processor further including a retirement buffer comprising architecture state registers for storing retired result data, said processor setting a valid bit in said reservation station during a first clock cycle for micro-instructions having source operands which comprise either immediate value or data value stored in said architectural state registers;
said processor further comprising:
an execution unit for executing said instruction following dispatch by said reservation station;
a reorder buffer for buffering result data from said execution unit until said result data is ready for retirement to said architectural state registers;
an instruction decoder for decoding an instruction stream and providing said instruction to said reservation station;
an allocator for providing write enable signals to said reservation station to enable the writing of said instruction and its corresponding source operands to said reservation station; and
a register alias table for storing information about result data stored in said retirement buffer;
said instruction decoder providing immediate value validity information to said reservation station during a first clock cycle whenever one of said source operands is an immediate value, and said register alias table providing retired value validity information to said reservation station during said first clock cycle whenever one of said source operands is one of said data values so that said reservation station schedules dispatch of said instruction prior to said source operands being computed as a result of the execution of another instruction.

11. The computer system of claim 10 further comprising OR logic circuitry for receiving said immediate value validity information and said retired value validity information, said OR logic providing a valid bit to said reservation station whenever one of said source operands comprises one of said immediate values or data values.

12. The computer system of claim 11 wherein said allocator provides one of said write enable signals to said reservation station for said OR logic circuitry to provide said valid bit to said reservation station during said first clock cycle, said process or further comprising latching means for providing said one of said write enable signals to said reservation station.

13. A pipelined processor comprising:
an execution unit that executes said instructions;
a reservation station (RS) that buffers said instructions and dispatches said instructions to said execution unit, said RS including:
a ready logic circuit that determines when an instruction is ready for dispatch based upon the availability of a source operand associated with said instruction; and
a plurality of entries corresponding to said instructions, each of said entries having associated therewith a first bit which indicates the availability of said source operand before said source operand is actually computed as a result of the execution of another instruction.

14. The pipelined processor of claim 13 further comprising:
an allocator that enables the writing of source operands and said instructions to said RS.

15. The pipelined processor of claim 14 further comprising:
a content addressable memory (CAM) circuit that sets said first bit when a storage address of said source operand matches a storage location address of said result, thereby indicating to said ready logic circuit that said instruction is ready for dispatch.

16. The pipelined processor of claim 15 wherein each of said entries have associated therewith a second bit which also indicates the availability of said source operand, said second bit being set upon allocation of said instruction to said RS when said source operand is an immediate value.

17. The pipelined processor of claim 16 further comprising:
a real register file (RRF) that contains retired operands, said second bit being set upon allocation of said instruction to said RS when said source operand is a retired operand in said RRF.

18. The pipelined processor of claim 16 wherein said execution unit is coupled to receive said immediate value from an entry of said RS that stores said instruction for execution thereof.

19. The pipelined processor of claim 14 further comprising:
a reorder buffer that contains speculative result data, upon allocation of said instruction to said RS said speculative result data being written to an entry of said RS that stores said instruction whenever said source operand has already been computed through execution of said another instruction; and
wherein said execution unit is coupled to receive speculative result data from said entry of said RS for execution of said instruction.

20. The pipelined processor of claim 19 further comprising:
a bypass mechanism that provides said source operand directly to said execution unit when said source operand is computed after dispatch of said instruction from said RS to said execution unit.

* * * * *